United States Patent
Marinsek et al.

(10) Patent No.: US 11,209,317 B2
(45) Date of Patent: Dec. 28, 2021

(54) INTERNAL IONIZING RADIATION SHIELDING FOR INFRARED CAMERAS

(71) Applicant: RAYTHEON COMPANY, Waltham, MA (US)

(72) Inventors: Stephen Marinsek, Albuquerque, NM (US); Thomas Sprafke, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 183 days.

(21) Appl. No.: 16/574,290

(22) Filed: Sep. 18, 2019

(65) Prior Publication Data
US 2021/0080326 A1 Mar. 18, 2021

(51) Int. Cl.
*G01J 5/04* (2006.01)
*G01J 5/10* (2006.01)
*G01J 5/00* (2006.01)

(52) U.S. Cl.
CPC .............. *G01J 5/041* (2013.01); *G01J 5/046* (2013.01); *G01J 5/048* (2013.01); *G01J 5/10* (2013.01); *G01J 2005/0077* (2013.01)

(58) Field of Classification Search
CPC .. G01J 5/041; G01J 5/046; G01J 5/048; G01J 5/10; G01J 2005/0077
See application file for complete search history.

(56) References Cited

U.S. PATENT DOCUMENTS

| 4,229,069 A | 10/1980 | Motin et al. |
| 5,635,754 A | 6/1997 | Strobel et al. |
| 8,964,021 B2 | 2/2015 | Barringer |
| 2005/0184240 A1 | 8/2005 | Cranford |
| 2011/0266443 A1* | 11/2011 | Schimert ................ G01J 1/0411 250/338.4 |

FOREIGN PATENT DOCUMENTS

| DE | 102016111253 A1 | 12/2017 |
| EP | 3392631 A1 | 10/2018 |

OTHER PUBLICATIONS

International Search Report and Written Opinion of International Patent Application No. PCT/US2020/046675 dated Nov. 9, 2020.

* cited by examiner

*Primary Examiner* — Mark R Gaworecki
(74) *Attorney, Agent, or Firm* — Lando & Anastasi, LLP

(57) ABSTRACT

Aspects and examples described herein provide a lightweight radiation shielding structure for infrared cameras. In one example, a top radiation shielding element and a bottom radiation shielding element are placed as close as possible to an infrared detector to minimize excess weight added to the infrared camera while providing optimal radiation shielding. Such aspects and examples provide important functionality for numerous weight-sensitive applications in high-radiation environments.

18 Claims, 8 Drawing Sheets

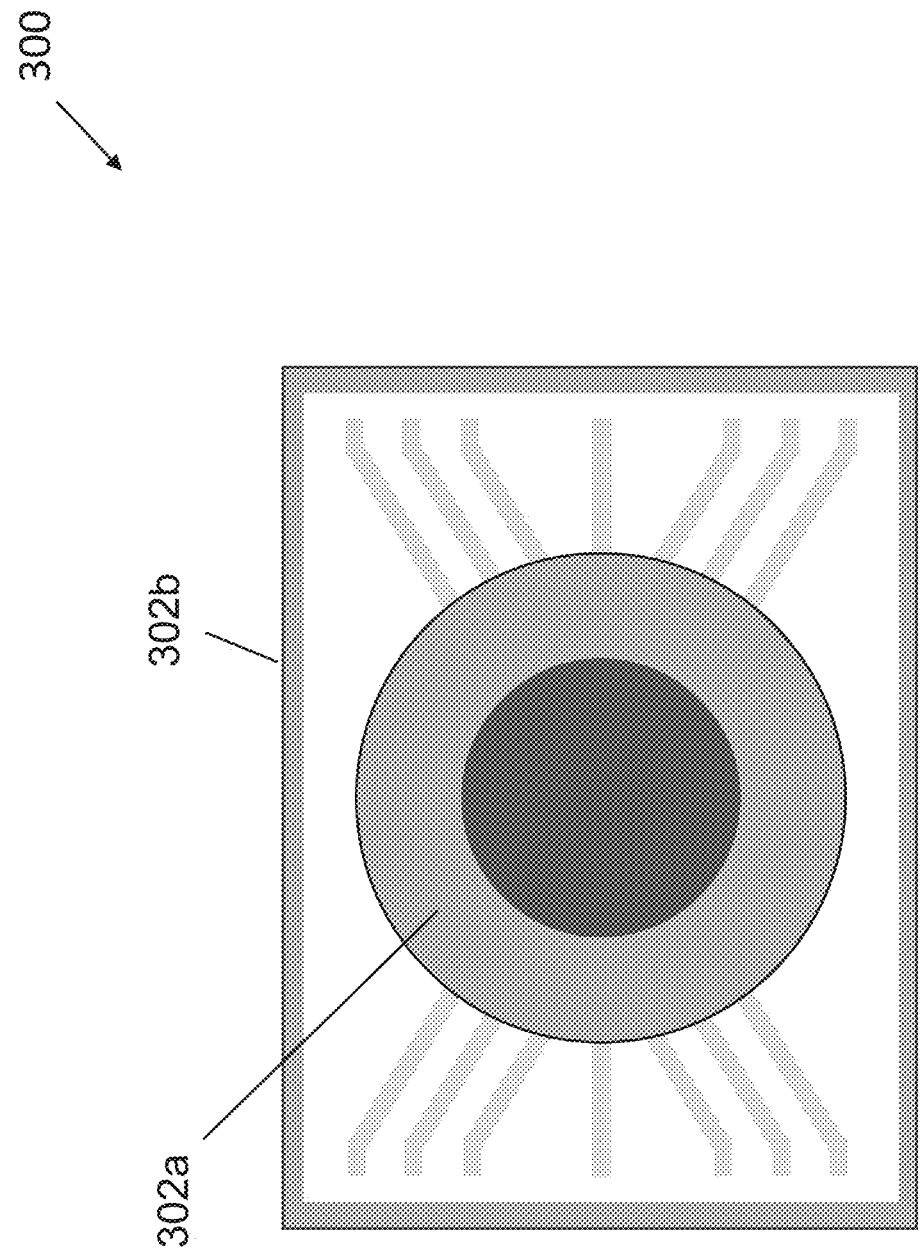

INTERNAL IONIZING RADIATION SHIELDING FOR INFRARED CAMERAS

BACKGROUND

During normal operation of an infrared camera, light is passed through a front-end optical system such that it forms an image incident upon an infrared detector. This incident light on the infrared camera may be a direct image of a scene or an object of interest, or it may be a spectrographic image showing the spectral distribution of a scene or an object. The incident light on the infrared camera is absorbed by the infrared detector and creates an electrical charge within the infrared detector material, which is collected, processed, and passed to external circuitry by a read-out integrated circuit (ROIC).

In some instances, infrared cameras may be used in high-radiation environments and the infrared detector may be exposed to ionizing radiation. Such an occurrence of ionizing radiation exposure can negatively impact and impair the functionality of the infrared detector. For example, these situations may occur when natural high energy radiation sources, such as those found in space-based applications, nuclear reactor diagnostics, and radiation sources produced within or outside of the earth's atmosphere, are directed at the infrared camera. In some cases, these conditions may even cause temporary or permanent damage to the infrared detector.

SUMMARY OF THE INVENTION

One aspect of the present disclosure is directed to a radiation shielding structure for an infrared detector assembly, the infrared detector assembly including an infrared detector and a read-out integrated circuit (ROIC) enclosed in an infrared detector assembly housing and the radiation shielding structure being configured to provide radiation shielding to the infrared detector and the ROIC. In one embodiment, the radiation shielding structure includes a top shielding element including a window opening to pass infrared light, the top shielding element being configured to be placed over the infrared detector and enclosed within the infrared detector assembly housing, and a bottom shielding element configured to be placed under the infrared detector and enclosed within the infrared detector assembly housing.

Embodiments of the radiation shielding structure further may include the top shielding element being configured to cover the ROIC and the bottom shielding element being configuring to be placed under a ceramic platform to which the infrared detector and the ROIC are affixed. In some embodiments, the top shielding element and the bottom shielding element may be made from a radiation resistant material. In certain embodiments, the top shielding element and the bottom shielding element may be made from a tungsten alloy. In one embodiment, the top shielding element may have a first thickness and the bottom shielding element may have a second thickness. In certain embodiments, the first and second thicknesses may be based on an amount of radiation to be exposed to the infrared detector assembly. In some embodiments, the second thickness may be different than the first thickness.

Another aspect of the present disclosure is directed to an infrared detector assembly. In one embodiment, the infrared detector assembly includes an infrared detector configured to collect infrared light incident thereon, a read-out integrated circuit (ROIC) coupled to the infrared detector, the ROIC being configured to process the infrared light collected by the infrared detector, a ceramic platform configured to support the infrared detector and the ROIC, and a radiation shielding structure including a top shielding element positioned above the infrared detector and a bottom shielding element positioned under the ceramic platform, the radiation shielding structure being configured to provide radiation shielding to the infrared detector and the ROIC.

Embodiments of the infrared detector assembly further may include an infrared detector assembly housing configured to enclose at least the infrared detector, the ROIC, the ceramic platform, and the radiation shielding structure. In some embodiments, the bottom shielding element may be bonded to the ceramic platform and the top shielding element may be bonded to the ceramic platform and/or fastened to the bottom shielding element. In one embodiment, the top shielding element has a first thickness and the bottom shielding element has a second thickness. In certain embodiments, the first and second thicknesses may be based on an amount of radiation to be exposed to the infrared detector assembly. In some embodiments, the second thickness may be different than the first thickness. In some embodiments, the top shielding element may include a window opening allowing infrared light to reach the infrared detector.

Another aspect of the present disclosure is directed to a method of assembling an infrared detector assembly. In one embodiment, the method includes positioning an infrared detector on top of a read-out integrated circuit (ROIC) to electrically and physically couple the infrared detector to the ROIC, securing the ROIC on a ceramic platform, installing a first shielding element of a radiation shielding structure beneath the ceramic platform, and installing a second shielding element of the radiation shielding structure over the infrared detector.

Embodiments of the method further may include enclosing the ROIC, the infrared detector, the ceramic platform, and the radiation shielding structure in an infrared detector assembly housing. In one embodiment, installing the first shielding element may include bonding and/or fastening the first shielding element to a bottom side of the ceramic platform. In some embodiments, installing the second shielding element may include bonding the second shielding element to a top side of the ceramic platform and/or fastening the second shielding element to the first shielding element. In certain embodiments, installing the second shielding element may include covering the ROIC with the second radiation shielding element.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a diagram illustrating a top-down view of an infrared detector assembly including a radiation shielding structure according to one embodiment.

DETAILED DESCRIPTION

Figure 1A:
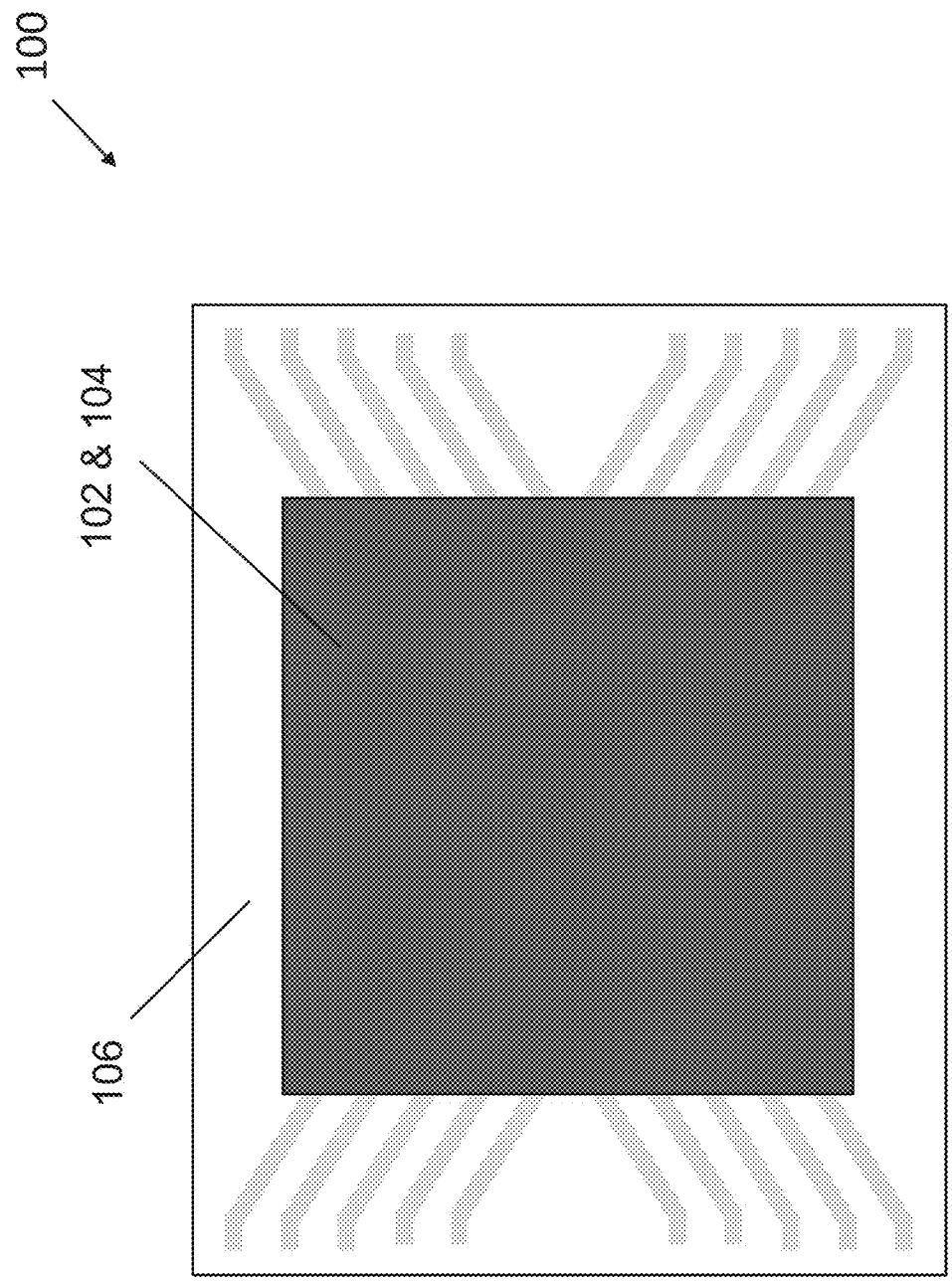
FIG. 1A is a diagram illustrating a top-down view of an example infrared detector assembly.

As discussed above, in certain operational environments, an infrared detector within an infrared camera may be exposed to ionizing radiation. In some cases, exposure to such ionizing radiation can negatively impact, impair, and/or degrade the functionality of the infrared detector.

Some typical approaches to shield infrared cameras have included surrounding the entire infrared camera with a radiation shielding enclosure. Other approaches have included building an infrared detector assembly housing (e.g., dewar) out of radiation shielding material. However, such arrangements are excessively heavy and bulky. Many infrared camera applications, such as space-based imaging, are extremely sensitive to weight.

Accordingly, it is desirable to reduce the excess weight associated with the radiation shielding of infrared cameras. As such, various aspects and examples discussed herein provide an improved, lightweight radiation shielding structure for infrared cameras. In at least one example, radiation shielding elements are included inside the infrared detector assembly housing. Specifically, a top radiation shield is placed above the infrared detector and a bottom radiation shield is placed below the infrared detector. Such aspects and examples of radiation shielding techniques provide enhanced functionality for numerous weight-sensitive applications in high-radiation environments, such as space-based imaging.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

In one example, an infrared camera may include a front-end optical system and a detector system enclosed in an infrared camera housing. The optical system includes at least one lens configured to collect infrared light and to focus the infrared light into an image. In some examples, the image is processed by directing the focused infrared light to the detector system. In one example, the detector system may include an infrared detector assembly enclosed in an infrared detector assembly housing.

FIG. 1A illustrates an example of an infrared detector assembly generally indicated at 100 that includes an infrared detector 102 and a read-out integrated circuit (ROIC) 104 mounted on a ceramic platform 106. In other examples, the infrared detector 102 and ROIC 104 may be mounted on a printed wiring board or platform made from other types of electrically insulative materials. The infrared detector 102 is configured to collect infrared light incident on the infrared detector assembly 100. The incident light is absorbed by the infrared detector 102 and creates an electrical charge within the infrared detector material, which is collected, processed, and passed to external circuitry by the ROIC 104.

Figure 1B:
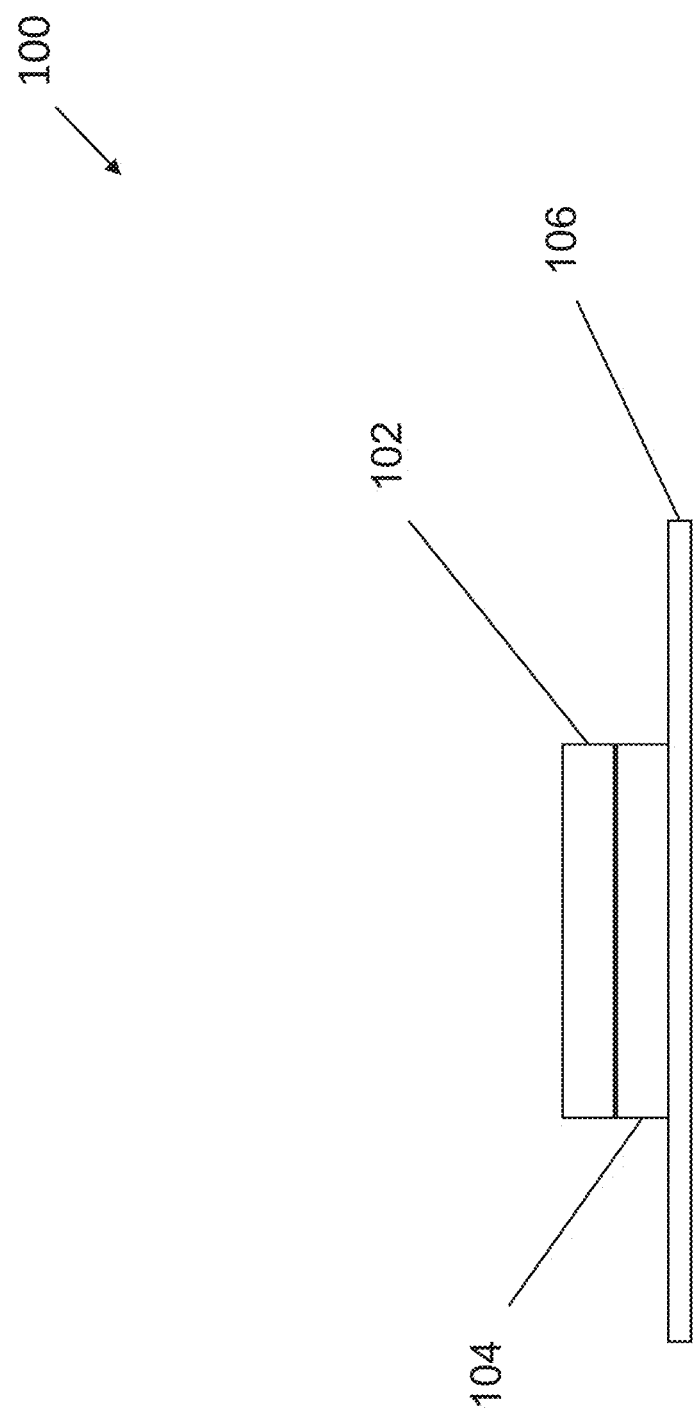
FIG. 1B is a diagram illustrating a side-view of an example infrared detector assembly.

FIG. 1B shows the infrared detector assembly 100. In one example, the infrared detector 102 and the ROIC 104 may be stacked on the ceramic platform 106; however, in other examples, the infrared detector 102 and the ROIC may be arranged differently. In some examples, the infrared detector 102 and ROIC 104 may be physically and electrically interconnected via a matrix of small metallic bumps. In another example, the infrared detector 102 and the ROIC 104 may be interconnected using an interposer substrate placed between the two devices. The interposer substrate may include through vias to electrically couple the infrared detector 102 to the ROIC 104. In other examples, the infrared detector 102 may be a microelectromechanical system (MEMS) grown on top of the ROIC 104. The ROIC 104 may be connected to the ceramic platform 106 using a flip chip structure and/or wire bonds. In some examples, different configurations of the infrared detector 102 and the ROIC 104 may correspond to different types of infrared cameras; e.g., cooled and uncooled infrared cameras.

Figure 1C:
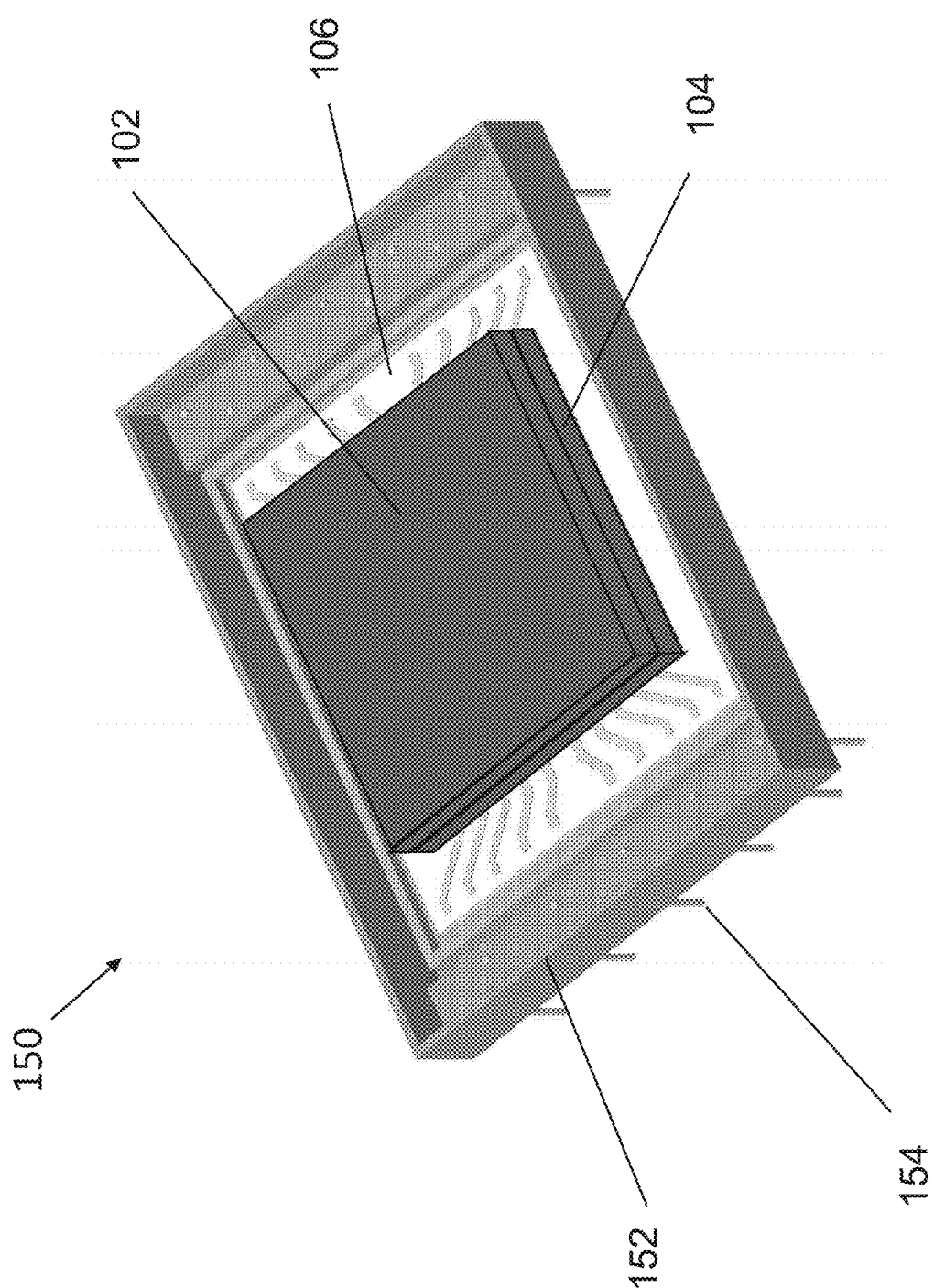
FIG. 1C is a diagram illustrating a perspective view of an exemplary infrared detector assembly and housing.

FIG. 1C illustrates an example of the infrared detector assembly 100 placed inside of an infrared detector assembly housing 152. Only the bottom half of the infrared detector assembly housing 152 is shown for clarity. The top half of the infrared detector assembly housing 152 (not shown) includes a window opening allowing light to pass through to the infrared detector 102. As shown in FIGS. 1A-1C, the ceramic platform 106 includes breakout traces from the ROIC 104 that extend to the edge of the platform. In one example, the breakout traces may be located on the surface of the ceramic platform 106; however, in other examples the ceramic platform 106 may be multi-layered and the breakout traces may be located on the surface and/or internal layers. The breakout traces may be connected to the housing leads 154 to provide signals or electric charge from the ROIC 104 to external circuitry. In some examples, the breakout traces on the ceramic platform 106 may be coupled to the housing leads 154 using wire bonds.

As discussed above, the infrared detector assembly 100 may be used in high-radiation environments and the infrared detector 102 may be exposed to harmful ionizing radiation. Typical approaches for shielding infrared cameras have included surrounding the entire infrared detector assembly 100 and infrared detector assembly housing 152 with a radiation shielding enclosure and/or building the infrared detector assembly housing 152 out of heavy, dense radiation shielding materials. These approaches can significantly increase the weight and bulk of infrared cameras, making them nonideal for weight-sensitive applications.

An improved, lightweight radiation shielding structure for infrared cameras is provided herein. In at least one embodiment, the elements of the radiation shielding structure are located inside of an infrared detector assembly housing. More specifically, the elements of the radiation shielding structure are placed as close as possible to the infrared detector to minimize excess weight added to the infrared camera while providing optimal radiation shielding.

Figure 2A:
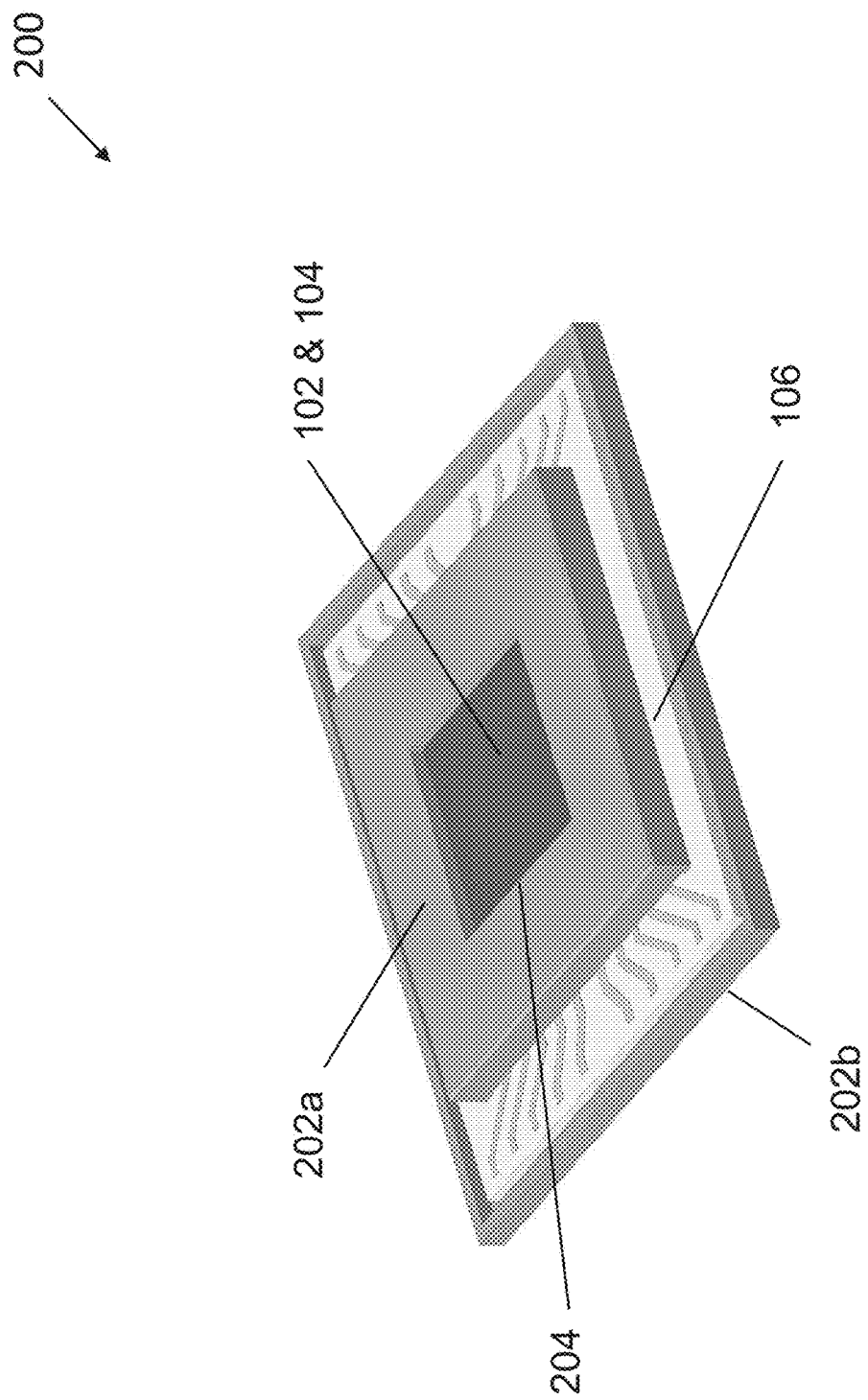
FIG. 2A is a diagram illustrating a perspective view of an infrared detector assembly including a radiation shielding structure according to one embodiment.

FIG. 2A illustrates an example of one embodiment of a shielded infrared detector assembly generally indicated at 200 including a radiation shielding structure in accordance with aspects described herein. The radiation shielding structure includes a top shielding element 202a and a bottom shielding element 202b. The top shielding element 202a is placed over or above the infrared detector 102 and in some examples the top shielding element may also cover the ROIC 104. The top shielding element 202a is positioned to prevent ionizing radiation incident on the frontside of the infrared detector assembly 200 from reaching the infrared detector 102. The top shielding element 202a includes a window opening 204 such that infrared light may still be absorbed by the infrared detector 102. The bottom shielding element 202b is placed beneath the ceramic platform 106 and is positioned to prevent ionizing radiation incident on the backside of the infrared detector assembly 200 from reaching the infrared detector 102. In some examples, the shielding elements 202a and 202b may also provide radiation shielding for the ROIC 104, reducing false readings and improving the resolution of the infrared detector assembly 200.

Figure 2B:
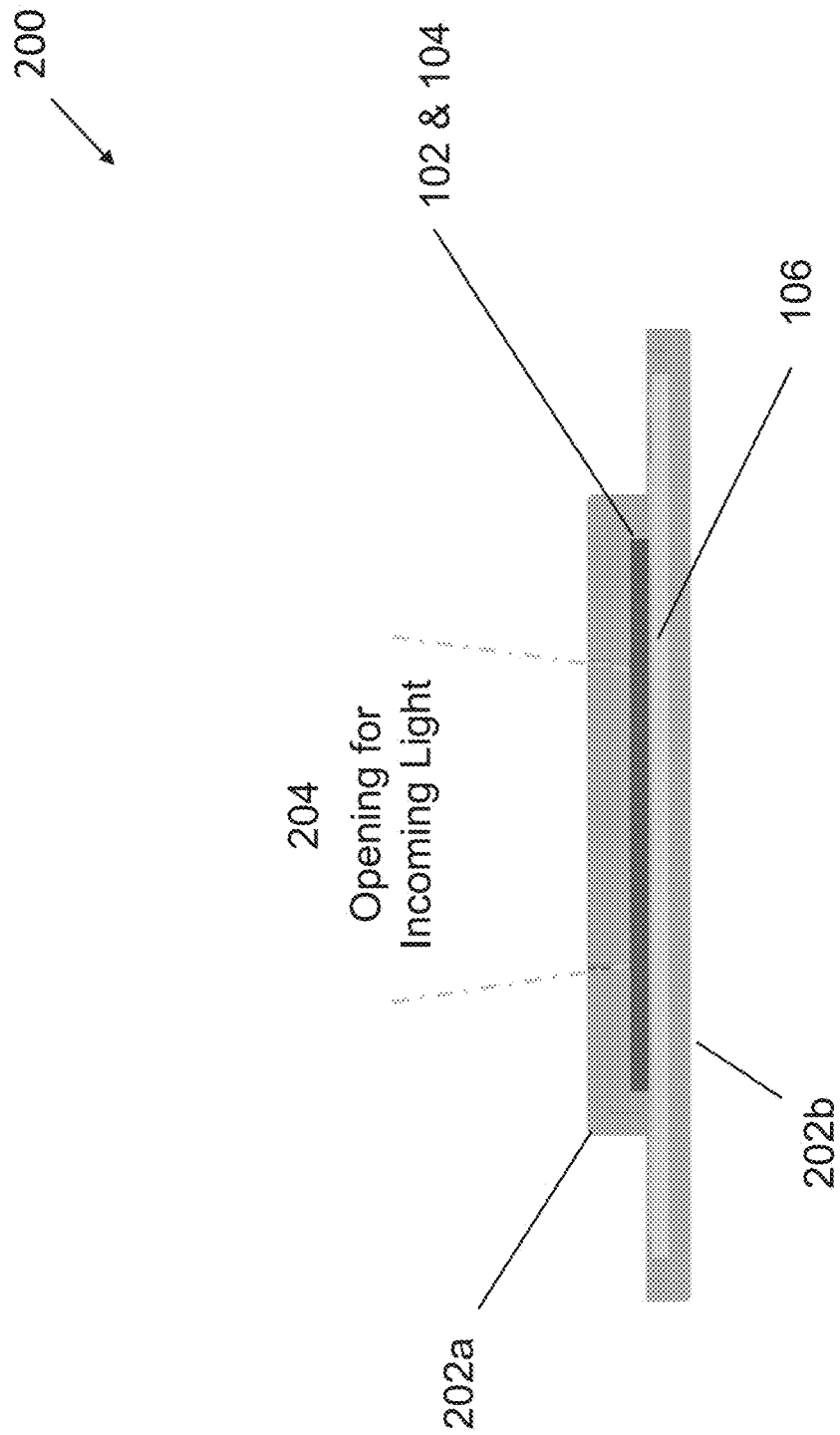
FIG. 2B is a diagram illustrating a side-view of an infrared detector assembly including a radiation shielding structure according to one embodiment.

FIG. 2B shows the infrared detector assembly 200 including the radiation shielding structure. As shown, the top shielding element 202a may form an enclosure around the infrared detector 102 and the ROIC 104. Likewise, the bottom shielding element 202b may form an enclosure around the ceramic platform 106. In some examples, the top shielding element 202a may extend down the sides of the infrared detector 102 and the ROIC 104 to be flush with the ceramic platform 106. In other examples, the top shielding element 202a may only extend down to the ceramic platform 106 in specific locations. For example, the top shielding element 202a may include feet or cutouts such that the top shielding element 202a does not interfere with electrical traces on the ceramic platform 106. In some examples, the top shielding element 202a may be mounted on standoffs and elevated from the ceramic platform 106.

Figure 2C:
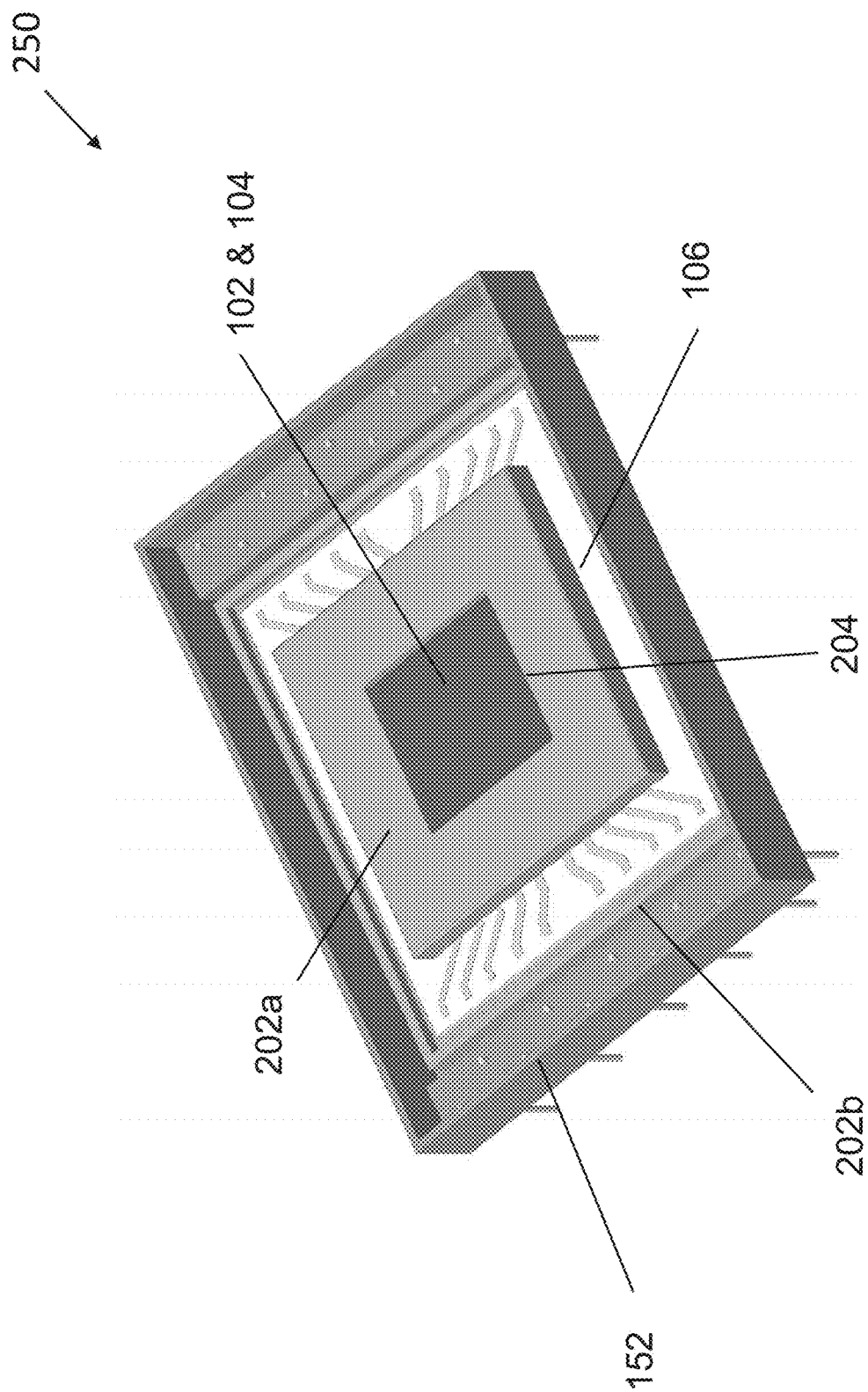
FIG. 2C is a diagram illustrating a perspective view of an infrared detector assembly and housing including a radiation shielding structure according to one embodiment.

FIG. 2C illustrates an example of the infrared detector assembly 200 placed inside of the infrared detector assembly housing 152. Only the bottom half of the infrared detector assembly housing 152 is shown for clarity. In one example, the window opening in the top half of the infrared detector assembly housing 152 (not shown) may be substantially the same size as the window opening 204 of the top shielding element 202a. In other examples, the window opening 204 of the top shielding element 202a may be a different size (e.g., smaller) than the window opening of the infrared detector assembly housing 152. As shown in FIG. 2C, the bottom shielding element 202b may be placed against the bottom of the infrared detector assembly housing 152. In some examples, a non-conductive material (e.g., an epoxy) may be placed between the bottom shielding element 202b and the infrared detector assembly housing 152.

In one embodiment, the top shielding element 202a and the bottom shielding element 202b can be made from any material capable of blocking, absorbing, or attenuating ionizing radiation. For example, the shielding elements 202a and 202b may be made from tungsten alloys, lead, tin, or any other radiation resistant material. In some embodiments, the amount of radiation shielding provided by the radiation shielding structure is proportional to the thickness of the shielding elements 202a and 202b. For example, in some examples, increasing the thickness of the top shielding element 202a and/or the bottom shielding element 202b may increase the amount of radiation that the radiation shielding structure can resist or absorb. In some examples, the thicknesses of the shielding elements 202a and 202b may be different and may be selected based on an operational environment or an expected amount of radiation to be exposed to the infrared detector assembly 200. For example, the thicknesses of the first and second shielding elements 202a and 202b may be selected such that an adequate amount of radiation shielding is provided for a specific operational environment while maintaining an acceptable weight of the infrared detector assembly 200 for an intended application.

In one embodiment, the radiation shielding elements 202a and 202b may be bonded or fastened to the ceramic platform 106 based on thickness. For example, a thin shielding element may be bonded to the ceramic platform 106 using an adhesive material and a thick shielding element may be fastened to the ceramic platform 106 using a through-hole fastener (e.g., a screw). In one example, both shielding elements 202a and 202b may be bonded to the ceramic platform 106. In another example, both shielding elements 202a and 202b may be fastened to the ceramic platform. In some examples, one of the shielding elements 202a or 202b may be bonded to the ceramic platform 106 and the other shielding element may be fastened to the ceramic platform 106. In certain examples, at least one of the shielding elements 202a and 202b may be bonded and fastened to the ceramic platform 106. In some embodiments, the top shielding element 202a may be fastened or secured to the bottom shielding element 202b and the ceramic platform 106 may be bonded to the bottom shielding element 202b.

In one embodiment, as shown in FIGS. 2A-2C, the radiation shielding elements 202a and 202b may have a square or rectangular shape; however, in other embodiments, the radiation shielding elements may be any other shape or form, such as a circular shape. In some examples, the top radiation shielding element 202a and the bottom radiation shielding element 202b may have different shapes. For example, FIG. 3 illustrates an example of one embodiment of an infrared detector assembly generally indicated at 300 including a top radiation shielding element 302a having a circular shape and a bottom radiation shielding element 302b having a rectangular shape. In some examples, the shape of the top shielding element 202a and/or the bottom shielding element 202b may be determined based on various factors including the shape of the infrared detector 102, the intended operational environment, weight restrictions for specific applications, etc.

Figure 4:
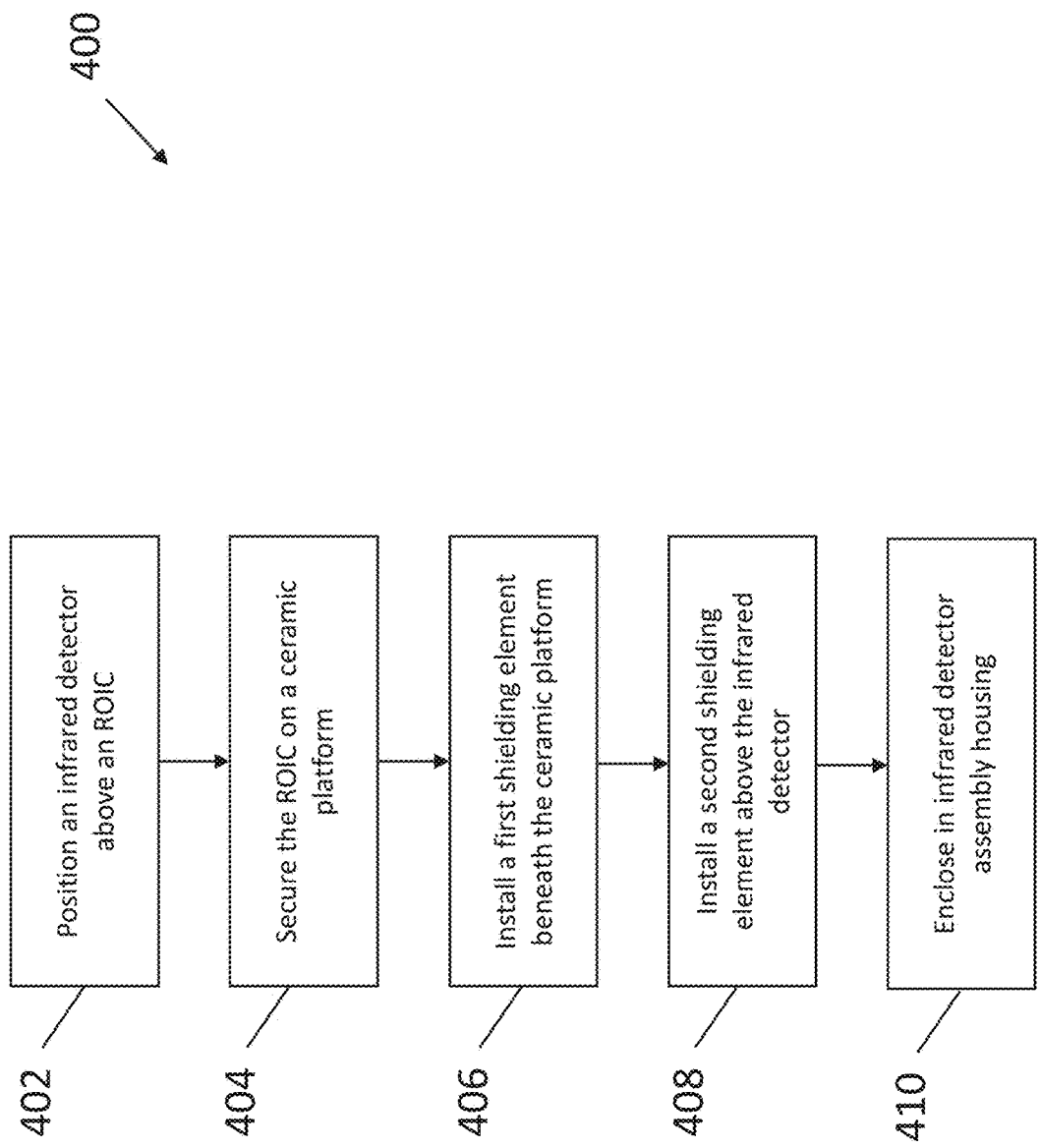
FIG. 4 is a diagram illustrating a method of assembling an infrared detector assembly including a radiation shielding structure according to one embodiment.

FIG. 4 illustrates a method of assembling an infrared detector assembly. The method, generally indicated at 400, includes assembling an infrared detector assembly having a radiation shielding structure. In one embodiment, the method 400 may be utilized to assemble the infrared detector assembly 200, for example.

At step 402, the infrared detector 102 is positioned above the ROIC 104. In one example, the infrared detector 102 is positioned or secured to the ROIC 104, such that the infrared detector 102 and the ROIC 104 are electrically and physically coupled. At step 404, the ROIC 104 is secured on the ceramic platform 106. In some examples, the ROIC 104 may be soldered, bonded, fastened, or secured in a different manner to the ceramic platform 106. At step 406, the first shielding element (e.g., the bottom shielding element 202b) is installed below the ceramic platform 106. In some examples, the first shielding element may be bonded and/or fastened to the ceramic platform 106. At step 408, a second shielding element (e.g., the top shielding element 202a) is installed above the infrared detector 102. In one example, the second shielding element may cover both the infrared detector 102 and the ROIC 104. In some examples, the second shielding element may be bonded and/or fastened to the ceramic platform 106. In certain examples, the second shielding element may be fastened to the first shielding element. At step 410, the infrared detector 102, the ROIC 104, the ceramic platform 106, and the first and second shielding elements are enclosed in the infrared detector assembly housing 152.

Accordingly, various aspects and examples discussed herein provide an improved, lightweight radiation shielding structure for infrared cameras. In at least one example, radiation shielding elements are included inside the infrared detector assembly housing. Specifically, a top radiation shield is placed above the infrared detector and a bottom radiation shield is placed below the infrared detector. Such aspects and examples provide important functionality for numerous weight-sensitive applications in high-radiation environments, such as space-based imaging.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A radiation shielding structure for an infrared detector assembly, the infrared detector assembly including an infrared detector and a read-out integrated circuit (ROIC) enclosed in an infrared detector assembly housing, the infrared detector assembly further including a ceramic platform configured to support the infrared detector and the ROIC and an infrared detector assembly housing configured to enclose at least the infrared detector, the ROIC, the ceramic platform, and the radiation shielding structure, the radiation shielding structure being configured to provide radiation shielding to the infrared detector and the ROIC, the radiation shielding structure comprising:
    a top shielding element including a window opening to pass infrared light, the top shielding element being configured to be placed over the infrared detector and enclosed within the infrared detector assembly housing; and
    a bottom shielding element configured to be placed under the infrared detector and enclosed within the infrared detector assembly housing,
    wherein the bottom shielding element is bonded to the ceramic platform and the top shielding element is bonded to the ceramic platform and/or fastened to the bottom shielding element.

2. The radiation shielding structure of claim 1, wherein the top shielding element is further configured to cover the ROIC.

3. The radiation shielding structure of claim 2, wherein the bottom shielding element is further configured to be placed under a ceramic platform to which the infrared detector and the ROIC are affixed.

4. The radiation shielding structure of claim 1, wherein the top shielding element and the bottom shielding element are made from a radiation resistant material.

5. The radiation shielding structure of claim 4, wherein the top shielding element and the bottom shielding element are made from a tungsten alloy.

6. The radiation shielding structure of claim 4, wherein the top shielding element has a first thickness and the bottom shielding element has a second thickness.

7. The radiation shielding structure of claim 6, wherein the first and second thicknesses are based on an amount of radiation to be exposed to the infrared detector assembly.

8. The radiation shielding structure of claim 7, wherein the second thickness is different than the first thickness.

9. An infrared detector assembly comprising:
    an infrared detector configured to collect infrared light incident thereon;
    a read-out integrated circuit (ROIC) coupled to the infrared detector, the ROIC being configured to process the infrared light collected by the infrared detector;
    a ceramic platform configured to support the infrared detector and the ROIC;
    a radiation shielding structure including a top shielding element positioned above the infrared detector and a bottom shielding element positioned under the ceramic platform, the radiation shielding structure being configured to provide radiation shielding to the infrared detector and the ROIC; and
    an infrared detector assembly housing configured to enclose at least the infrared detector, the ROIC, the ceramic platform, and the radiation shielding structure,
    wherein the bottom shielding element is bonded to the ceramic platform and the top shielding element is bonded to the ceramic platform and/or fastened to the bottom shielding element.

10. The infrared detector assembly of claim 9, wherein the top shielding element has a first thickness and the bottom shielding element has a second thickness.

11. The infrared detector assembly of claim 10, wherein the first and second thicknesses are based on an amount of radiation to be exposed to the infrared detector assembly.

12. The infrared detector assembly of claim 11, wherein the second thickness is different than the first thickness.

13. The infrared detector assembly of claim 9, wherein the top shielding element includes a window opening allowing infrared light to reach the infrared detector.

14. A method of assembling an infrared detector assembly, the method comprising:
    positioning an infrared detector on top of a read-out integrated circuit (ROIC) to electrically and physically couple the infrared detector to the ROIC;
    securing the ROIC on a ceramic platform;
    installing a first shielding element of a radiation shielding structure beneath the ceramic platform; and
    installing a second shielding element of the radiation shielding structure over the infrared detector.

15. The method of claim 14, further comprising enclosing the ROIC, the infrared detector, the ceramic platform, and the radiation shielding structure in an infrared detector assembly housing.

16. The method of claim 14, wherein installing the first shielding element further includes bonding and/or fastening the first shielding element to a bottom side of the ceramic platform.

17. The method of claim 16, wherein installing the second shielding element further includes bonding the second shielding element to a top side of the ceramic platform and/or fastening the second shielding element to the first shielding element.

18. The method of claim 14, wherein installing the second shielding element further includes covering the ROIC with the second radiation shielding element.

\* \* \* \* \*